(12) United States Patent
Smith

(10) Patent No.: US 10,972,448 B2
(45) Date of Patent: Apr. 6, 2021

(54) TECHNOLOGIES FOR DATA BROKER ASSISTED TRANSFER OF DEVICE OWNERSHIP

(71) Applicant: Intel Corporation, Santa Clara, CA (US)

(72) Inventor: Ned M. Smith, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 918 days.

(21) Appl. No.: 15/187,635

(22) Filed: Jun. 20, 2016

(65) Prior Publication Data

US 2017/0366347 A1    Dec. 21, 2017

(51) Int. Cl.
*H04L 29/06* (2006.01)
*H04L 9/32* (2006.01)

(52) U.S. Cl.
CPC ............ *H04L 63/08* (2013.01); *H04L 9/3221* (2013.01); *H04L 9/3247* (2013.01); *H04L 9/3268* (2013.01); *H04L 2209/38* (2013.01); *H04L 2209/56* (2013.01)

(58) Field of Classification Search
CPC ..... H04L 63/08; H04L 9/3247; H04L 9/3221; H04L 2209/56; H04L 2209/38; H04L 9/3268
See application file for complete search history.

(56) References Cited

U.S. PATENT DOCUMENTS

| | | | |
|---|---|---|---|
| 2009/0150297 A1* | 6/2009 | Richard | G06F 21/6245 705/80 |
| 2009/0183241 A1* | 7/2009 | Anderson | H04L 63/10 726/4 |
| 2015/0269570 A1* | 9/2015 | Phan | G06Q 20/3276 705/71 |
| 2016/0164884 A1* | 6/2016 | Sriram | G06Q 10/06315 705/51 |
| 2016/0217436 A1* | 7/2016 | Brama | G06Q 20/06 |
| 2017/0046792 A1* | 2/2017 | Haldenby | G06Q 20/0655 |
| 2017/0085555 A1* | 3/2017 | Bisikalo | G06F 16/9535 |
| 2017/0213210 A1* | 7/2017 | Kravitz | G06Q 30/06 |
| 2017/0250814 A1* | 8/2017 | Brickell | H04L 9/3247 |
| 2018/0108024 A1* | 4/2018 | Greco | H04L 9/3236 |
| 2019/0108364 A1* | 4/2019 | Roennow | G06Q 20/0658 |

* cited by examiner

*Primary Examiner* — Huan V Doan
(74) *Attorney, Agent, or Firm* — Jaffery Watson Mendonsa & Hamilton LLP

(57) ABSTRACT

Technologies for transferring ownership of a compute device include a data broker device to receive a provenance verification key of the compute device from a manufacturer device, receive attestation data of the compute device, and verify a provenance of the compute device based on the attestation data. The attestation data is indicative of one or more security attributes of the compute device. The data broker device updates a block chain with an acknowledgment of an assignment of the compute device to the data broker device, wherein the block chain identifies each transaction associated with ownership of the compute device.

22 Claims, 7 Drawing Sheets

US 10,972,448 B2

TECHNOLOGIES FOR DATA BROKER ASSISTED TRANSFER OF DEVICE OWNERSHIP

BACKGROUND

The Internet of Things (IoT) ecosystem has seen rapid growth in recent years and an IoT device to human ratio of 25-to-1 in the near future would not be particularly surprising. Bitcoin and other cryptocurrencies allow for the recording of and payment transfer for electronic transactions associated with the sale/purchase of IoT devices and other devices. However, with the deployment of billions of IoT devices, managing the complex problems of establishing and transferring rightful device ownership contexts can be quite daunting for IoT system designers.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
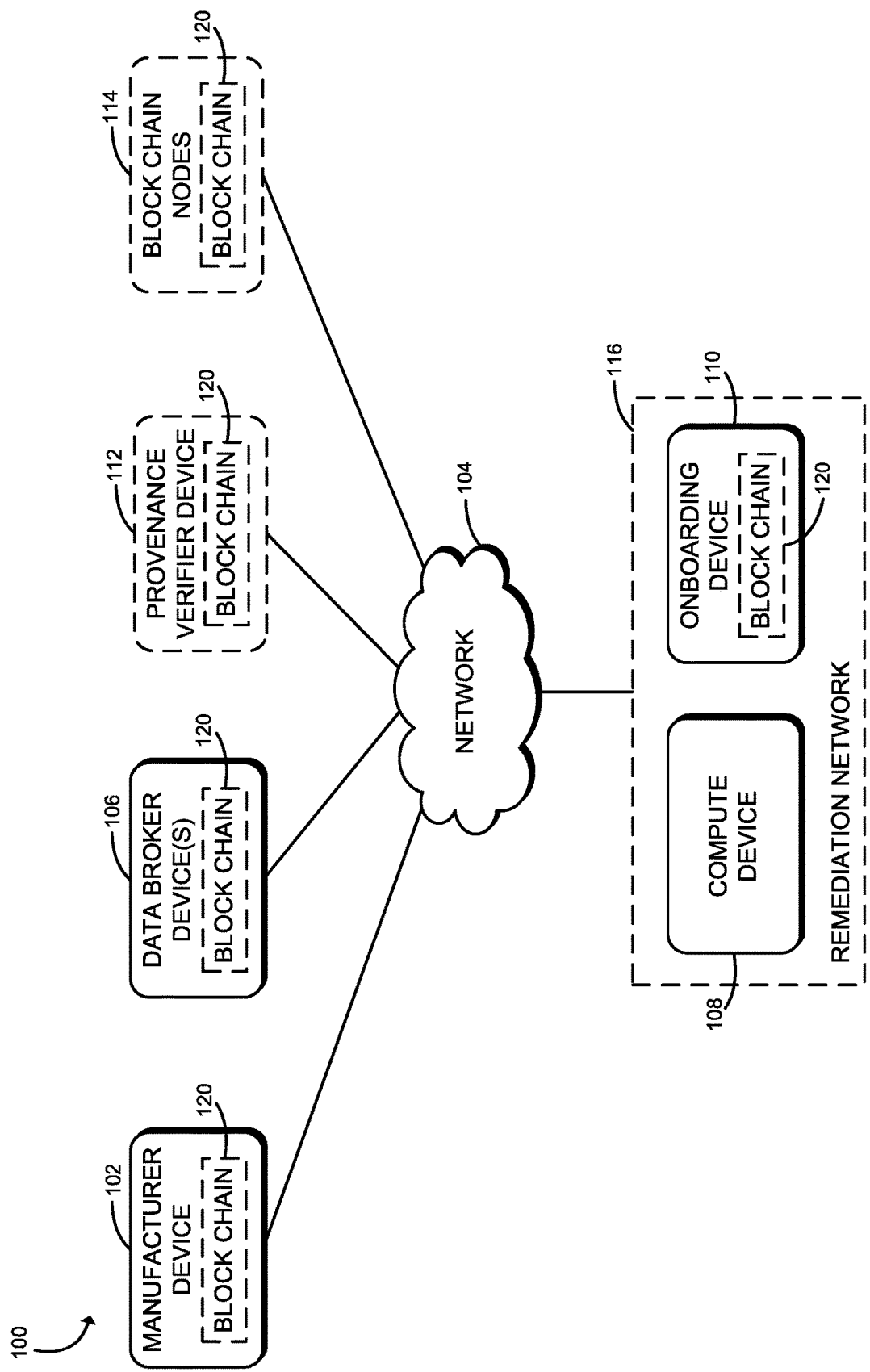
FIG. 1 is a simplified block diagram of at least one embodiment of a system for transferring device ownership.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for transferring device ownership is shown. It should be appreciated that the system 100 includes one or more entities for data brokerage and provenance verification that utilize a block chain (e.g., a Bitcoin block chain) to facilitate the transfer of device ownership while allowing users to track ownership (e.g., via a public record) and/or device assignment. In some embodiments, a manufacturer may securely transfer ownership of a constrained device (e.g., an IoT compute device) to an owner/buyer brokered by the brokerage and/or provenance verification entity. Subsequently, the constrained device may securely publish its data to the one or more data brokerage and/or provenance verification entities, which may sell the data (e.g., on an open market) in exchange for a commission paid to the device owner. It should be appreciated that the block chain 120 may be implemented as a Bitcoin block chain or an alternative block chain depending on the particular embodiment (e.g., using another cryptocurrency that involves block chains). It should be further appreciated that, in a complex distribution chain involving may potential points of distribution or where the supply chain and distribution chain overlap, the techniques described herein establish a chain-of-custody that is open to public inspection and investigation should suspicion of impropriety exist (i.e., posterity of the record by virtue of the block chain 120).

As shown in FIG. 1, the system 100 includes a manufacturer device 102, a network 104, one or more data broker devices 106, a compute device 108, and an onboarding device 110. Additionally, in some embodiments, the system 100 may include a provenance verifier device 112 and/or one or more distinct block chain nodes 114. Although only one manufacturer device 102, one network 104, one compute device 108, one onboarding device 110, and one provenance verifier device 112 are illustratively shown in FIG. 1, the system 100 may include any number of manufacturer devices 102, networks 104, compute devices 108, onboarding devices 110, and/or provenance verifier devices 112 in other embodiments.

Each of the manufacturer device 102, the data broker devices 106, the compute devices 108, the onboarding devices 110, the provenance verifier device 112, and/or the block chain nodes 114 may be embodied as any type of computing device capable of performing the functions described herein. For example, in some embodiments, each of the manufacturer device 102, the data broker device(s) 106, the compute device 108, the onboarding device 110, the provenance verifier device 112, and/or the block chain nodes 114 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

For example, in some embodiments, the manufacturer device 102 is a device of the manufacturer of one or more compute devices 108 (e.g., constrained IoT devices), the data broker device 106 is a device that facilitates/brokers the transfer of ownership of the compute devices from a seller (e.g., the manufacturer) to a buyer (e.g., a distributor, retailer, consumer, resale market consumer, etc.), the onboarding device 110 is a device or tool that facilitates that onboarding of the compute device 108 (e.g., via a remediation network 116), the provenance verifier device 112 is a device that verifies the provenance of compute devices 108, and the block chain nodes 114 are devices associated with constructing a chain of transaction (e.g., the block chain 120). In some embodiments, distinct block chain nodes 114 may be responsible for storing and updating the block chain 120, whereas in other embodiments, the block chain 120 may be distributed across other devices of the system 100 including, for example, the manufacturer device 102, the data broker device(s) 106, onboarding device 110, and/or the provenance verifier device 112. That is, in some embodiments, one or more of those devices of the system 100 may serve as block chain nodes 114. It should be appreciated that the block chain nodes 114 and/or other devices of the system 100 responsible for storing and updating the block chain 120 may periodically synchronize the block chain 120 (e.g., in response to a determination that a transaction block of the block chain 120 is "full"). It should further be appreciated that, in some embodiments, the data broker device 106 may perform one or more functions of the provenance verifier device 112.

As described below, in some embodiments, a user may supply connectivity to the compute device 108 in such a way that that compute device 108 may communicate with the data broker device 106 and/or the provenance verifier device 112 and access the block chain 120. For example, in some embodiments, the connectivity of the compute device 108 may be limited to a remediation network 116. Accordingly, the onboarding device 110 may serve as a trusted execution environment or trusted entity (e.g., a "sandbox"). In some embodiments, the remediation network 116 serves as a secure out-of-band network to permit a device to be isolated until its security has been confirmed (e.g., during device discovery, commissioning, and/or ownership transfer).

Figure 2:
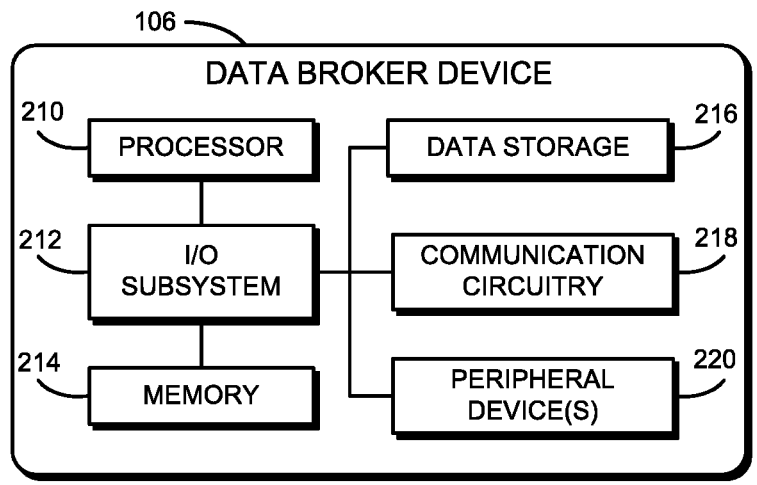
FIG. 2 is a simplified block diagram of at least one embodiment of a data broker device of the system of FIG. 1.

As shown in FIG. 2, the illustrative data broker device 106 includes a processor 210, an input/output ("I/O") subsystem 212, a memory 214, a data storage 216, a communication circuitry 218, and one or more peripheral devices 220. Of course, the data broker device 106 may include other or additional components, such as those commonly found in a typical computing device (e.g., various input/output devices, peripheral devices, and/or other components), in other embodiments. Additionally, in some embodiments, one or more of the illustrative components may be incorporated in, or otherwise form a portion of, another component. For example, the memory 214, or portions thereof, may be incorporated in the processor 210 in some embodiments.

The processor 210 may be embodied as any type of processor capable of performing the functions described herein. For example, the processor 210 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the corresponding manufacturer device 102 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the data broker device 106. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the data broker device 106, on a single integrated circuit chip.

The data storage 216 may be embodied as any type of device or devices configured for short-term or long-term storage of data such as, for example, memory devices and circuits, memory cards, hard disk drives, solid-state drives, or other data storage devices. The data storage 216 and/or the memory 214 may store various data during operation of the data broker device 106 as described herein.

The communication circuitry 218 may be embodied as any communication circuit, device, or collection thereof, capable of enabling communications between the data broker device 106 and other remote devices over a network (e.g., the network 104). The communication circuitry 218 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 220 may include any number of additional peripheral or interface devices, such as speakers, microphones, additional storage devices, and so forth. The particular devices included in the peripheral devices 220 may depend on, for example, the type and/or intended use of the data broker device 106.

Referring back to FIG. 1, the network 104 may be embodied as any type of communication network capable of facilitating communication between the data broker device 106 and remote devices (e.g., the compute device 108). As such, the network 104 may include one or more networks, routers, switches, computers, and/or other intervening devices. For example, each network 104 may be embodied as or otherwise include one or more cellular networks, telephone networks, local or wide area networks, publicly available global networks (e.g., the Internet), an ad hoc network, or any combination thereof.

In some embodiments, the manufacturer device 102, the compute device 108, the onboarding device 110, the provenance device 112, and/or the block chain nodes 114 may include components similar to those of the data broker device 106 discussed above. The description of those components of the data broker device 106 is equally applicable to the description of components of the manufacturer device 102, the compute device 108, the onboarding device 110, the provenance device 112, and/or the block chain nodes 114 and is not repeated herein for clarity of the description. Further, it should be appreciated that the manufacturer device 102, the compute device 108, the onboarding device 110, the provenance device 112, and/or the block chain nodes 114 may include other components, sub-components, and devices commonly found in a computing device, which are not discussed above in reference to the data broker device 106 and not discussed herein for clarity of the description. In some embodiments, one or more of the components of the data broker device 106 may be omitted from the manufacturer device 102, the compute device 108, the onboarding device 110, the provenance device 112, and/or the block chain nodes 114.

Figure 3:
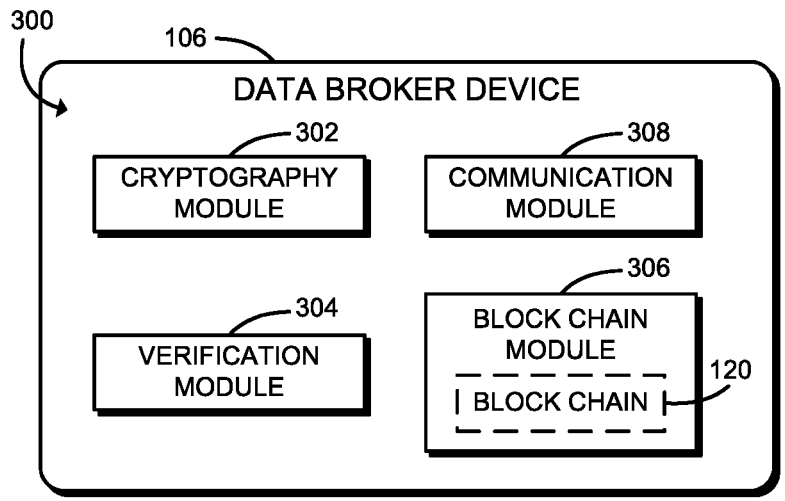
FIG. 3 is a simplified block diagram of at least one embodiment of an environment of the data broker device of FIG. 2.

Referring now to FIG. 3, in use, the data broker device 106 establishes an environment 300 for transferring device ownership. The illustrative environment 300 includes a cryptography module 302, a verification module 304, a block chain module 306, and a communication module 308. The various modules of the environment 300 may be embodied as hardware, software, firmware, or a combination thereof. For example, the various modules, logic, and other components of the environment 300 may form a portion of, or otherwise be established by, the processor 210 or other hardware components of the data broker device 106. As such, in some embodiments, one or more of the modules of the environment 300 may be embodied as circuitry or collection of electrical devices (e.g., a cryptography circuitry, a verification circuitry, a block chain circuitry, and/or a communication circuitry). Additionally, in some embodiments, one or more of the illustrative modules may form a portion of another module and/or one or more of the illustrative modules may be independent of one another. Further, in some embodiments, one or more of the modules of the environment 300 may be omitted from a particular manufacturer device 102.

The cryptography module 302 is configured to perform various cryptographic and/or security functions on behalf of the data broker device 106. In some embodiments, the cryptography module 302 may be embodied as a cryptographic engine, an independent security co-processor of the data broker device 106, a cryptographic accelerator incorporated into the processor 210, or a standalone software/firmware. Depending on the particular embodiment, the cryptography module 302 may generate and/or utilize various cryptographic keys (e.g., symmetric/asymmetric cryptographic keys) for encryption, decryption, signing, and/or signature verification. Further, in some embodiments, the cryptography module 302 may generate cryptographic hashes of various data (e.g., using keyed or un-keyed hashes). Additionally, in some embodiments, the cryptography module 302 may establish a secure connection with remote devices over a network. It should further be appreciated that, in some embodiments, the cryptography module 302 and/or another module of the data broker device 106 may establish a trusted execution environment or secure enclave within which a portion of the data described herein may be stored and/or a number of the functions described herein may be performed.

The verification module 304 is configured to verify the provenance of the compute device 108. In particular, in some embodiments, the verification module 304 may receive and verify an attestation quote and/or a zero knowledge proof (ZKP) of the provenance of the compute device 108. As described below, in order to perform one or more verification functions, the data broker device 106 may generate and/or receive various cryptographic keys. For example, the verification module 304 may receive a public Enhanced Privacy Identification (EPID) key received from the manufacturer device 102 during provisioning of the compute device 108.

The block chain module 306 is configured to update the block chain 120 corresponding with the compute device 108 to record a transfer of ownership and/or other suitable data as described herein. In the illustrative embodiment, it should be appreciated that the inclusion of the transaction data by the data broker device 106 to the block chain 120 virtually guarantees that the data will be fixed forever and therefore trustworthy. As such, in some embodiments, it may be unnecessary to utilize a certificate provided by a certificate authority in a public key infrastructure to serve as the root of trust. As described herein, in some embodiments, the block chain 120 may be distributed across multiple devices of the system 100 and periodically synchronized across devices. It should be appreciated that, in some embodiments, the block chain module 306 permits the data broker device 106 to transfer cryptocurrency with various devices of the system 100. For example, as described herein, the block chain module 306 may transfer Bitcoin Satoshis to various devices and record the information described herein to the available space in the block chain header (e.g., the 80 byte header for arbitrary data). Of course, in other embodiments, the block chain module 306 may utilize another suitable cryptocurrency, block chain, and lowest denomination of that currency to perform the functions described herein (e.g., via a null or pseudo-null transaction).

The communication module 308 is configured to handle the communication between the data broker device 106 and other computing devices of the system 100. It should be appreciated that the communication module 308 may utilize any suitable algorithm or protocol for such communication.

Figure 4:
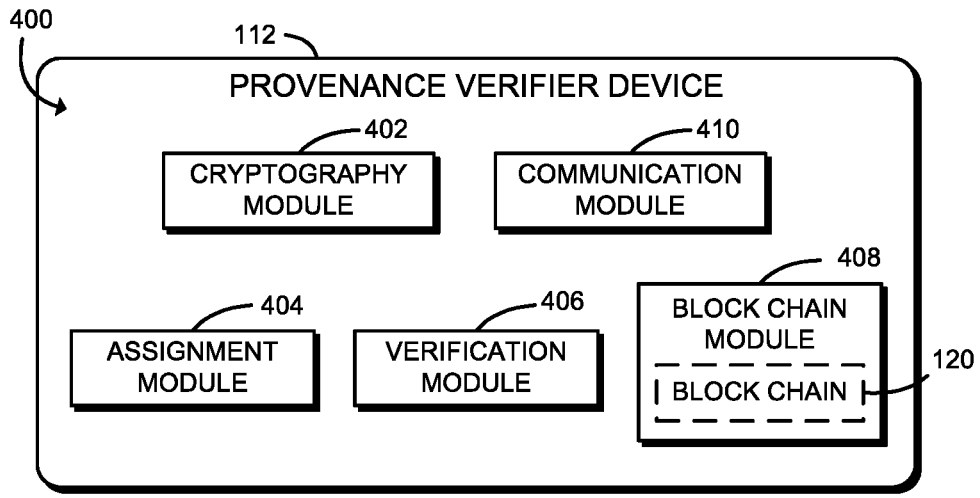
FIG. 4 is a simplified block diagram of at least one embodiment of an environment of a provenance verifier device of FIG. 1.

Referring now to FIG. 4, in use, the provenance verifier device 112 establishes an environment 400 for transferring device ownership. The illustrative environment 400 includes a cryptography module 402, an assignment module 404, a verification module 406, a block chain module 408, and a communication module 410. The various modules of the environment 400 may be embodied as hardware, software, firmware, or a combination thereof. For example, the various modules, logic, and other components of the environment 400 may form a portion of, or otherwise be established by, the processor or other hardware components of the provenance verifier device 112. As such, in some embodiments, one or more of the modules of the environment 400 may be embodied as circuitry or collection of electrical devices (e.g., a cryptography circuitry, an assignment circuitry, a verification circuitry, a block chain circuitry, and/or a communication circuitry). Additionally, in some embodiments, one or more of the illustrative modules may form a portion of another module and/or one or more of the illustrative modules may be independent of one another.

The cryptography module 402 of the provenance verifier device 112 is configured to perform various cryptographic and/or security functions on behalf of the provenance verifier device 112 and may be similar to the cryptography module 302 of the data broker device 106. As such, in some embodiments, the cryptography module 402 may be embodied as a cryptographic engine, an independent security co-processor of the provenance verifier device 112, a cryptographic accelerator incorporated into the processor of the provenance verifier device 112, or a standalone software/firmware. Depending on the particular embodiment, the cryptography module 402 may generate and/or utilize various cryptographic keys (e.g., symmetric/asymmetric cryptographic keys) for encryption, decryption, signing, and/or signature verification. Further, in some embodiments, the cryptography module 402 may generate hashes (e.g., cryptographic hashes) of various data (e.g., using keyed or un-keyed hashes). Additionally, in some embodiments, the cryptography module 402 may establish a secure connection with remote devices over a network. It should further be appreciated that, in some embodiments, the cryptography module 402 and/or another module of the provenance verifier device 112 may establish a trusted execution environment or secure enclave within which a portion of the data described herein may be stored and/or a number of the functions described herein may be performed.

The assignment module 404 is configured to handle the assignment of data brokers to compute devices 108. For example, as described below, the assignment module 404 of the provenance verifier device 112 may assign a particular compute device 108 to a data broker device 106. Further, in some embodiments, the assignment module 404 may de-assign the compute device 108 from the compute device 108 and assign it to another data broker device 106 (e.g., during a subsequent transaction involving the compute device 108).

The verification module 406 is configured to verify the provenance of the compute device 108. In particular, in some embodiments, the verification module 406 may receive and verify an attestation quote and/or a zero knowledge proof (ZKP) of the provenance of the compute device 108. As described herein, in order to perform one or more verification functions, the provenance verifier device 112 may generate and/or receive various cryptographic keys (e.g., a public EPID key of the compute device 108).

The block chain module 408 may be similar to the block chain module 306 of the data broker device 106. As such, the block chain module 408 is configured to update the block chain 120 corresponding with the compute device 108 to record a transfer of ownership and/or other suitable data as described herein. Additionally, the block chain module 408 may permit the provenance verifier device 112 to transfer cryptocurrencies to various devices of the system 100 as described herein. It should further be appreciated that the block chain module 408 may verify various transactions recorded on the block chain 120 using a suitable mechanism.

The communication module 410 is configured to handle the communication between the provenance verifier device 112 and other computing devices of the system 100. It should be appreciated that the communication module 410 may utilize any suitable algorithm or protocol for such communication.

It should be appreciated that the manufacturer device 102, the compute device 108, the onboarding device 110, and/or the block chain nodes 114 may establish environments similar to the environment 300 of the data broker device 106 and/or the environment 400 of the provenance verifier device 112. As such, each of those corresponding environments may include modules similar to the environments 300, 400, the description of which is equally applicable to the modules of the manufacturer device 102, the compute device 108, the onboarding device 110, and/or the block chain nodes 114 and omitted for clarity of the description. Of course, the manufacturer device 102, the compute device 108, the onboarding device 110, and/or the block chain nodes 114 of the system 100 may include other modules not shown for simplicity of the description.

Figure 5:
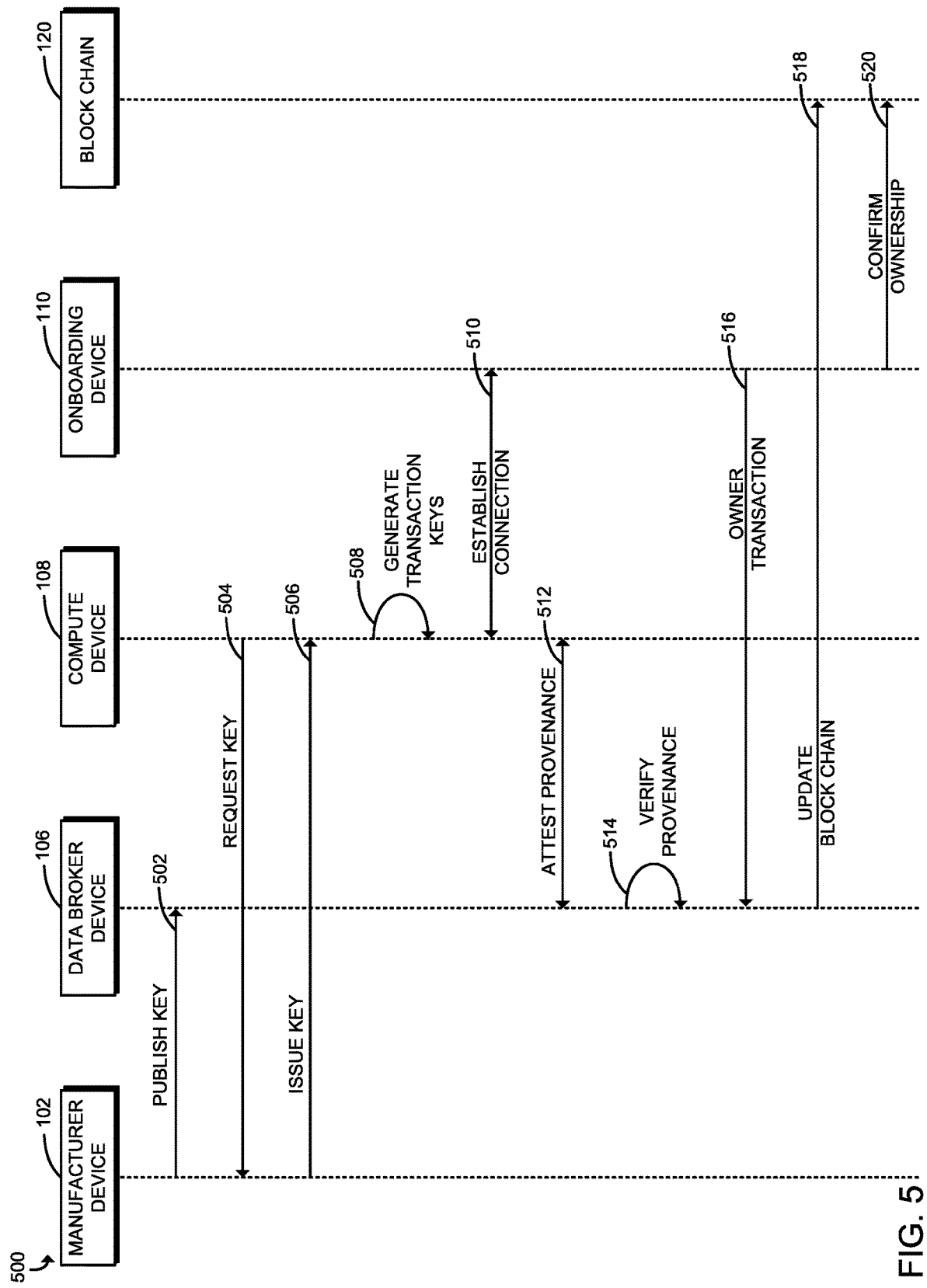
FIG. 5 is a simplified flow diagram of at least one embodiment of a method for transferring device ownership.

Referring now to FIG. 5, at least one embodiment of a communication flow 500 for transferring device ownership involves the manufacturer device 102, the data broker device 106, the compute device 108, and the onboarding device 110 of FIG. 1. It should be appreciated that those devices may communicate with one another over one or more networks 104 and/or remediation networks 116. The illustrative communication flow 500 includes a number of data flows, which may be executed separately or together, depending on the particular embodiment and the particular data flow.

As described below, it should be appreciated that several of the devices of the system 100 generate or are otherwise assigned a public-private cryptographic key pair for secure communication. For example, in the illustrative embodiment, KCD_mfg_pub is a public EPID group key embedded by a device manufacturer in a group of compute devices 108 for attestation and KCD_mfg_priv is the corresponding private EPID key of a particular compute device 108. Further, KCD_trans_pub and KCD_trans_priv are a cryptographic key pair generated by the compute device 108 for ownership transfer, KCD_data_pub and KCD_data_priv are a cryptographic key pair generated by the compute device 108 for data publication, KOBT_trans_pub and KOBT_trans_priv are a cryptographic key pair generated by the onboarding device/tool 110 used to claim ownership of devices it onboards, KOBT_data_pub and KOBT_data_priv are a cryptographic key pair generated by the owner to receive micro payments (e.g., Bitcoin Satoshis) for data published to the data broker device 106, KPV_trans_pub and KPV_trans_priv are a cryptographic key pair generated by the provenance verifier device 112 to process device ownership transfers, KDB_data_pub and KDB_data_priv are a cryptographic key pair generated by the data broker device 106 to process micro payments for data published by constrained devices (e.g., the compute device 108), KDB2_data_pub and KDB2_data_priv are a cryptographic key pair generated by another data broker device 106B to process micro payments for data published by constrained devices. Of course, in some embodiments, the system 100 may utilize other cryptographic keys different from, or in addition to, those described herein.

In the illustrative embodiment, each compute device 108 is provisioned with a private EPID key that corresponds with a public EPID that identifies a group of devices of the manufacturer (e.g., devices having the same make/model/version and/or of a common device type). For example, in some embodiments, the system 100 may utilize an EPID-Join protocol to facilitate the management of keys and member devices. It should be appreciated that, in other embodiments, another suitable one-to-many cryptographic scheme may be used consistent with the techniques described herein. At data flow 502, the manufacturer device 102 may transmit the public EPID of the compute device 108 to the data broker device 106 or provenance verification device 112, for example, to support device attestation verification. In some embodiments, the manufacturer device 102 may transmit the public EPID key to the data broker device 106, whereas in other embodiments, the manufacturer device 102 may publish the key to the block chain 120 (e.g., for subsequent retrieval by the data broker device 106). At data flow 504, the compute device 108 requests the appropriate keying material (e.g., the private EPID key of the compute device 108) during the manufacturing process and, at data flow 506, the manufacturer device 102 issues the keying material (e.g., the private EPID key) to the compute device 108. As discussed above, in some embodiments, the manufacturer device 102 and the compute device 108 may perform such functions by employing an EPID-Join protocol. In some embodiments, the compute device 108 may incorporate a random number into the EPID-Join protocol, for example, to introduce additional entropy to the key to the private EPID key.

At data flow 508, the compute device 108 may generate additional cryptographic keys for use in communicating with other devices of the system 100. For example, in some embodiments, the compute device 108 may generate a pair of asymmetric cryptographic keys (i.e., a public-private key pair) to use for device ownership transfers (e.g., KCD_trans_pub and KCD_trans_priv) and another pair of asymmetric cryptographic keys to use for protecting data originating from the compute device 108 (e.g., KCD_data_pub and KCD_data_priv). As such, the compute device 108 has one or more private cryptographic keys and corresponding public keys that can authenticate them.

At data flow 510, the compute device 108 establishes a communication connection with the onboarding device 110. Of course, it should be appreciated that, in some embodiments, the compute device 108 may establish a communication connection with the onboarding device 110 prior to the data flow 510. It should be appreciated that, in some embodiments, a unique instance of a compute device 108 seeking onboarding (e.g., confirmed by the use of a key/PIN used in connection with an ESPEKE, PAKE, or other suitable protocol) establishes a transaction identifier (TxID) that also embodies the uniqueness properties typically associated with a manufacturer-embedded unique key (e.g., an manufacturer certificate). However, in such embodiments, the transaction identifier (TxID) may not compromise privacy in the way a manufacturer certificate in, because the transaction identifier cannot be used to track the device throughout its lifecycle. It should be appreciated that EPID may play a role in supporting attestation without compromising privacy in that the transaction identifier (TxID) and trust established in the block chain 120 ensures that each compute device 108 onboarded is attesting on behalf of the onboarding event marked by the transaction identifier as the transaction identifier is included in the attestation information.

In some embodiments, it is assumed that the other devices of the system 100 communicating with the compute device 108 do so via a remediation network 116, which could be established via a key/PIN (e.g., a number provided on packaging of the compute device 108), a random number generated by the compute device 108 and communicated out-of-band to the onboarding device/tool 110 (e.g., via ultrasonic sound, haptics, infrared light, and/or another suitable mechanism). In other words, in some embodiments, the onboarding device 110 serves as a secure and trusted communication channel between the compute device 108 and various other devices of the system 100.

At data flow 512, the compute device 108 connects to the data broker device 106 (or the provenance verifier device 112) and attests to its security properties/attributes using the private EPID key provisioned by the manufacturer. As such, the compute device 108 transmits some attestation data (e.g., an attestation quote prepared by a trusted execution environment). In some embodiments, the onboarding device 110 selects the provenance verification entity (e.g., the data broker device 106 or the provenance verifier device 112) for use and establishes a connection with that entity. Further, the onboarding device 110 may instruct the compute device 108 to supply the cryptographic keys, KCD_trans_pub and KCD_data_pub, to the provenance verification entity, and the provenance verification entity provisions the compute device 108 to accept KOBT_trans_pub (i.e., the public key of the onboarding device 110) as the new owner pending confirmation from the onboarding device 110. In some embodiments, the compute device 108 negotiates a long-term session key (PSK), for example, via a Diffie-Hellman or PAKE key exchange algorithm, which may allow the provenance verification entity to recognize the specific compute device 108 in subsequent interactions.

At data flow 514, the data broker device 106 verifies the provenance of the compute device 108. In particular, in some embodiments, the data broker device 106 verifies the attestation key (KCD_mfg_priv) using the corresponding public key (KCD_mfg_pub) and saves the long-term session key (PSK) with the public keys received from the compute device 108. At data flow 516, the onboarding device 110 acknowledges that it is the entity that is taking ownership of the compute device 108 and taking administrative control of the compute device 108. In particular, the onboarding device 110 may deliver the device and owner transaction public keys (under PSK) to the data broker device 106.

It should be appreciated that data flows 518-520 illustrate the onboarding device 110 confirming the ownership transfer. To do so, the onboarding device 110 may inspect the block chain 120 and verify the ownership transaction of the data broker device 106 described at data flow 516 and recorded to the block chain 120 at data flow 518 is valid. It should be appreciated that the onboarding device 110 and other devices of the system 100 (e.g., the manufacturer device 102, the data broker device 106, the compute device 108, etc.) can review/inspect any transaction committed to the block chain 120 provided the device has the appropriate access/logic to do so.

At data flow 518, the data broker device 106 creates a block chain entry to the block chain 120 acknowledging the assignment of the compute device 108 (e.g., via KCD_data_pub) to the data broker device 106 (e.g., via KDB_data_pub). Additionally, in some embodiments, the block chain entry may further acknowledge the owner or onboarding device 110 is to receive micro payments (e.g., Bitcoin Satoshi) in exchange for data (e.g., via KOBT_data_pub) and/or acknowledge the transfer of ownership of the compute device 108 from the manufacturer to the new owner (e.g., via KOBT_trans_pub). It should be appreciated that the data broker device 106 may make such acknowledgements by cryptographically signing a transaction (e.g., a Bitcoin or other cryptocurrency transaction) and posting the transaction to the block chain 120. For example, in some embodiments, the message $Sign_{KPV\_trans\_priv}$(KCD_trans_pub, KCD_data_pub, KOBT_trans_pub, KOBT_data_pub) may be saved to the block chain 120. At data flow 520, the onboarding device 110 confirms the transfer of ownership of the compute device 108 by reviewing the block chain entries of the block chain 120. Further, in some embodiments, the onboarding device 110 may record an entry to the block chain 120 confirming possession and ownership of the compute device 108.

In some embodiments, the system 100 may utilize a transaction identifier (TxID), for example, to improve searching of the block chain 120 by the transaction participants (e.g., the devices 102, 106, 108, 110). To do so, each of the transaction participants may subscribe to the block chain 120 using a common transaction identifier. Thereafter, the transaction identifier may be included in all block chain 120 updates that are associated with the same transaction and/or all messages exchanges between the participants associated with a particular transaction. A participant beginning a new transaction (e.g., the compute device 108) may generate a transaction identifier for that transaction (e.g., at data flow 610 and/or data flow 704 described below). In addition to the features described therein, in some embodiments, the corresponding data flows may also inform each new transaction participant of the transaction identifier associated with that transaction. In other embodiments, the transaction participants may agree a priori on a broker with which they may register to handle such transaction identifier distribution such that, when a new transaction identifier is created, all relevant participated may be notified. As such, it should be appreciated that whenever an entity queries the block chain 120, that entity will already have possession of the transaction identifier and will, therefore, be able to more efficiently search the block chain 120 for relevant transactions.

Figure 6:
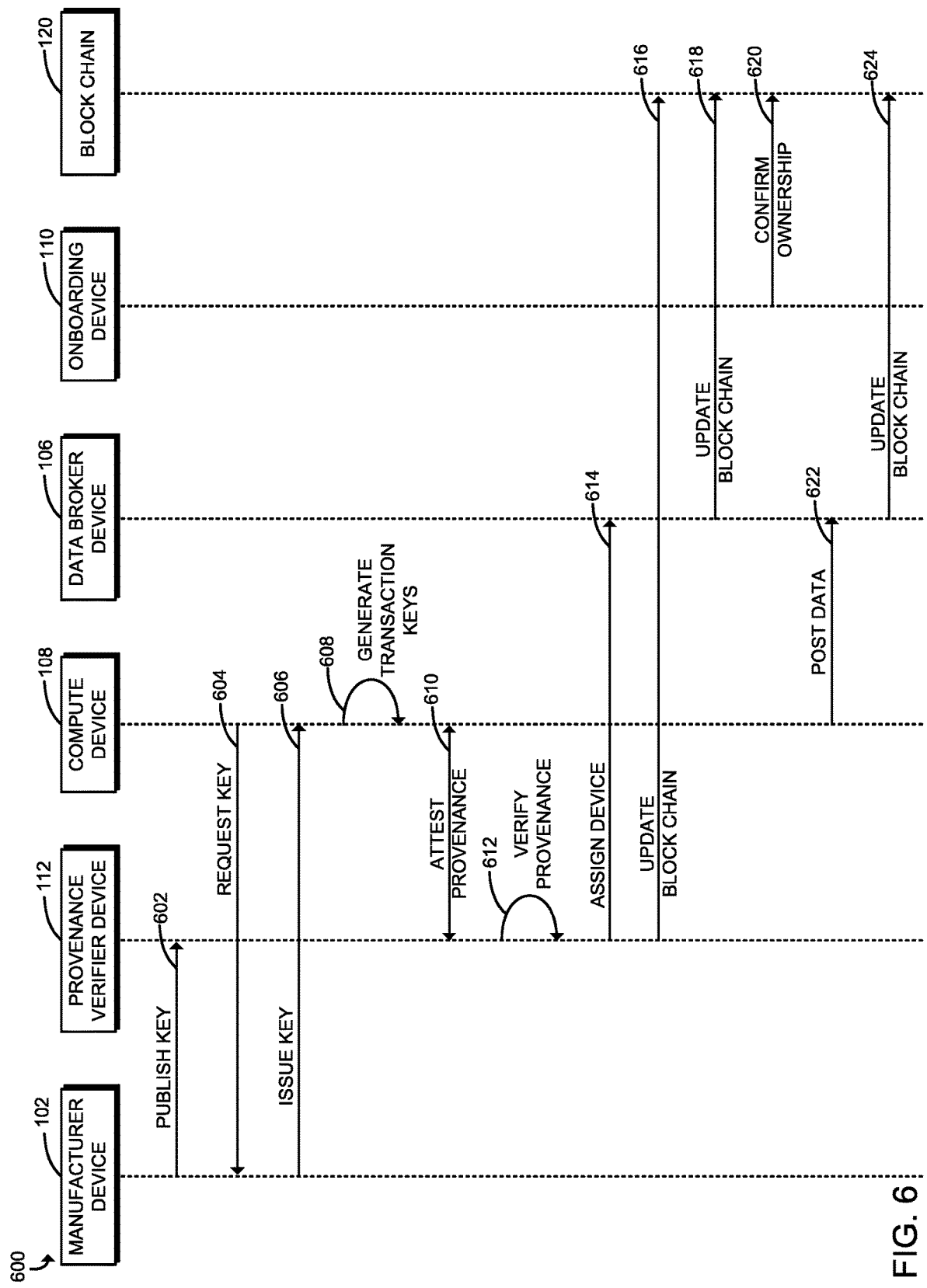
FIG. 6 is a simplified flow diagram of at least one embodiment of another method for transferring device ownership.

Referring now to FIG. 6, at least one embodiment of a communication flow 600 for transferring device ownership involves the manufacturer device 102, the data broker device 106, the compute device 108, the onboarding device 110, and the provenance verifier device 112 of FIG. 1. It should be appreciated that those devices may communicate with one another over one or more networks 104 and/or remediation networks 116. The illustrative communication flow 600 includes a number of data flows, which may be executed separately or together, depending on the particular embodiment and the particular data flow. It should be appreciated that, in some embodiments, the data brokerage and provenance verification functions of the system 100 may be divided among two different entities: the data broker device 106 and the provenance verifier device 112. Accordingly, in such embodiments, those functions may be optimized differently.

At data flow 602, the manufacturer device 102 (i.e., the provenance issuer) publishes the provenance verification key of the compute device 108 to the provenance verification device 112 to support device attestation verification. In particular, the public EPID key of the compute device 108 may be transmitted to the provenance verifier device 112 or published to the block chain 120 for subsequent retrieval. At data flow 604, the compute device 108 requests the appropriate keying material (e.g., the private EPID key of the compute device 108) during the manufacturing process and, at data flow 606, the manufacturer device 102 issues the keying material (e.g., the private EPID key) to the compute device 108. In some embodiments, an EPID-Join protocol may be executed to do so. At data flow 608, the compute device 108 may generate transaction keys for the provenance verifier device 112 and the data broker device 106 as described above.

At data flow 610, the compute device 108 connects to the provenance verifier device 112 and attests to its security properties using the private EPID key provisioned by the manufacturer device 102. In particular, in some embodiments, the onboarding device 110 selects the provenance verifier device 112 to use and establishes a connection to that provenance verifier device 112. Further, the onboarding device 110 may instruct the compute device 108 to supply the cryptographic keys, KCD_trans_pub and KCD_data_pub, to the provenance verifier device 112, and the provenance verifier device 112 provisions the compute device 108 to accept KOBT_trans_pub (i.e., the public key of the onboarding device 110) as the new owner pending confirmation from the onboarding device 110. In some embodiments, the compute device 108 negotiates a long-term session key (PSK), for example, via a Diffie-Hellman, PAKE, ESPEKE, SPEKE, JPAKE, or another suitable key exchange algorithm, which may allow the provenance verification entity to recognize the specific compute device 108 in subsequent interactions.

At data flow 612, the provenance verifier device 112 verifies the provenance of the compute device 108. In particular, in some embodiments, the provenance verifier device 112 verifies the attestation key (KCD_mfg_priv) using the corresponding public key (KCD_mfg_pub) and saves the long-term session key (PSK) with the public keys received from the compute device 108. Additionally, in some embodiments, the compute device 108 informs the provenance verifier device 112 which data broker to utilize. Of course, in some embodiments, the data broker selection may be performed by the provenance verifier device 112.

At data flow 614, the onboarding device 110 acknowledges that it is the entity that is taking ownership of the compute device 108 and taking administrative control of the compute device 108. Further, the provenance verifier device 112 may assign the compute device 108 to the data broke device 106 by forwarding KCD_data_pub to the data broker device 106. The data broker device 106 may verify transmissions from the compute device 108 using the received key, KCD_data_pub.

At data flow 616, the provenance verifier device 112 creates a block chain entry to the block chain 120 acknowledging the assignment of the compute device 108 (e.g., via KCD_data_pub) to the data broker device 106 (e.g., via KDB_data_pub). Additionally, the block chain entry may further acknowledge the owner or onboarding device 110 is to receive micro payments (e.g., Bitcoin Satoshi) in exchange for data (e.g., via KOBT_data_pub) and/or acknowledge the transfer of ownership of the compute device 108 from the manufacturer to the new owner (e.g., via KOBT_trans_pub). It should be appreciated that the data broker device 106 may make such acknowledgements by cryptographically signing a transaction (e.g., a Bitcoin or other cryptocurrency transaction) and posting the transaction to the block chain 120. For example, in some embodiments, the message $Sign_{KPV\_trans\_priv}$(KCD_trans_pub, KCD_data_pub, KOBT_trans_pub, KOBT_data_pub) may be saved to the block chain 120. In some embodiments, as part of the transaction, two Satoshis are transferred to the compute device 108 (KCD_trans_pub) and two Satoshis are transferred to the data broker device 106 (KDB_data_pub) via the public block chain 120. As described herein, it should be appreciated that the Satoshis may be utilized as a counting mechanism associated with pairing relationships among devices. For example, Satoshis are initially transferred to indicate a pairing relationship between the compute device 108 and the data broker device 106 and the subsequently undone when transferred to another owner (e.g., via transactions that counteract the initial Satoshi transfers).

At data flow 618, the data broker device 106 acknowledges the assignment for the compute device 108 as a data producer. In particular, the data broker device 106 may record the acknowledgement to the block chain 120 in some embodiments. Further, in some embodiments, the data broker device 106 may transfer one Satoshi back to the provenance verifier device 112 and retain the second Satoshi for future de-assignment of the compute device 108 as described below. The data broker device 106 may transfer the Satoshi by making a financial transaction with the receiving entity (e.g., the provenance verifier device 112).

At data flow 620, the onboarding device 110 confirms the transfer of ownership of the compute device 108 by reviewing the block chain entries of the block chain 120. Additionally, the onboarding device 110 may confirm the assignment of the data broker device 106 in some embodiments. In other words, in some embodiments, the onboarding device 110 may verify that KCD_trans_pub and KCD_data_pub were implicated in the updates to the block chain 120 by the provenance verifier device 112 and the data broker device 106, respectively. Further, the onboarding device 110 may transfer one Sitoshi from the compute device 108 to the provenance verifier device 112, which may serve as an acknowledgement that the transfer of device ownership to the new device owner is complete. In some embodiments, the onboarding device 110 may confirm with the compute device 108 that KOBT_trans_pub is the new owner key. The compute device 108 may compare that key to the pending KOBT_trans_pub value from data flow 610 and commit KOBT_trans_pub and KDB_data_pub to secure storage. It should be appreciated that those keys may be utilized by the compute device 108 to verify the onboarding device 110 and the data broker device 106 when establishing secure communication connections.

It should be appreciated that the techniques described above ensure that the device ownership has been established. Accordingly, the compute device 108 may want to post a public record to the block chain 120. For example, in an embodiment, the compute device 108 may be associated with e-commerce such that the data broker device 106 collects data over a period of time (e.g., a month) and after thirty days, the data broker device 106 posts a record indicated that thirty days of data has been processed and it is now appropriate to bill for those services. As such, at data flow 622, the compute device 108 may post data to the data broker device 106. In doing so, it should be appreciated that the compute device 108 may open a connection to the data broker device 106, authenticate the data broker device 106 with KDB_data_pub, and attest/authenticate to the data broker device 106 using KDB_data_priv. Further, the data broker device 106 may verify the received data using KCD_data_pub.

At data flow 624, the data broker device 106 may record the receipt of data from the compute device 108 on the block chain 120 and may transfer payment for the data. Although a record is added to the block chain 120 to indicate that the data has been received from the compute device 108, in some embodiments, the data itself is not recorded to the block chain 120 (e.g., to maintain the privacy of the data and/or in light of the small data space available in the block chain header).

Figure 7:
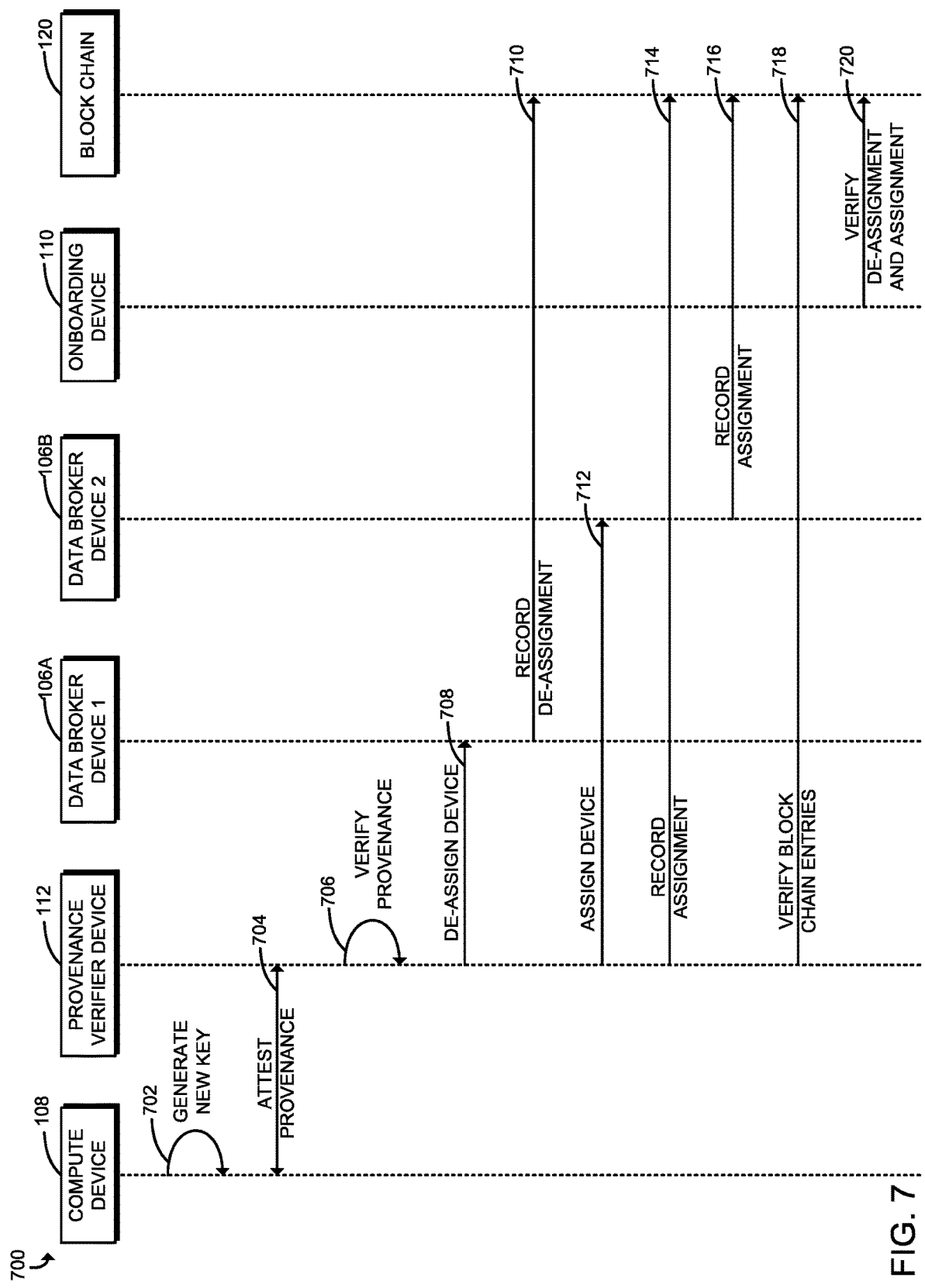
FIG. 7 is a simplified flow diagram of at least one embodiment of a method for data broker reassignment.

Referring now to FIG. 7, at least one embodiment of a communication flow 700 for data broker reassignment involves the compute device 108, the provenance verifier device 112, the data broker devices 106A, 106B, and the onboarding device 110 of FIG. 1. It should be appreciated that those devices may communicate with one another over one or more networks 104 and/or remediation networks 116. The illustrative communication flow 700 includes a number of data flows, which may be executed separately or together, depending on the particular embodiment and the particular data flow. As described below, in some embodiments, the owner of the compute device 108 may determine to utilize a data broker device 106B different from a current data broker device 106A. Further, in the illustrative embodiment, the owner may replace the data broker without rescinding ownership of the compute device 108.

At data flow 702, the compute device 108 generates a new cryptographic key pair (KCD2_data_pub and KCD2_data_priv) for communication with the data broker device 106B (i.e., a new data broker transaction key pair). At data flow 704, the compute device 108 establishes (or re-establishes) a communication connection to the provenance verifier device 112 and request de-assignment of the data broker 106A from the compute device 108 and assignment (i.e., re-assignment) of the new data broker device 106B to the compute device 108. In some embodiments, in doing so, the compute device 108 may utilize the existing PSK key and reference KCD_trans_pub to establish that the compute device 108 is already an owned device and that the data broker associated with the key KDB1_data_pub (i.e., the data broker device 106A) is the currently assigned data broker. Further, it should be appreciated that the compute device 108 may attest its provenance to the provenance verifier device 112.

At data flow 706, the provenance verifier device 112 verifies the provenance of the compute device 108. In doing so, the provenance verifier device 112 may determine whether the PSK and/or the new data broker keys are acceptable for subsequent use. In some embodiments, the PSK session fails if the compute device 108 and the provenance verifier device 112 cannot agree on the PSK key to use to establish a secure communication session.

At data flow 708, the data broker device 106A is de-assigned from the compute device 108. In particular, in some embodiments, the key KCD_data_pub associated with the compute device 108 is de-assigned from the data broker device 106A. In doing so, the provenance verifier device 112 may transmit an instruction for the data broker device 106A to perform one or more corresponding de-assignment actions. It should be appreciated that, in some embodiments, the data broker device 106A may be required (e.g., by privacy law) to remove the key KCD_data_pub and any associated transaction history from the memory 214 and/or the data storage 216 of the data broker device 106A.

At data flow 710, the data broker device 106A acknowledges the de-assignment and/or the removal of the key KCD_data_pub and the transaction history from the data broker device 106A. In particular, the data broker device 106A may add a record to the block chain 120 that is indicative of the de-assignment. For example, the data broker device 106A may post the key KCD_data_pub to the block chain. Further, in some embodiments, the data broker device 106A may also transfer one Satoshi to the provenance verifier device 112 in connection with the de-assignment. Of course, as indicated above, it should be appreciated that the system 100 may utilize a different cryptocurrency (i.e., different from Bitcoin) and corresponding block chain 120 in other embodiments. In such embodiments, the data broker device 106A may transfer one unit of the lowest denomination of that currency to the provenance verifier device 112 and/or commit a null or pseudo-null transaction. It should further be appreciated that posting the Satoshi may allow the provenance verifier device 112 to reference count assignment and de-assignment events that are supported by entries to a public block chain 120 as described above. Accordingly, in some embodiments, it may be impossible or virtually impossible for malware to hide just transactions and/or counting mechanisms.

At data flow 712, the provenance verifier device 112 assigns the data broker device 106B as the new data broker for the compute device 108. It should be appreciated that the provenance verifier device 112 may make such an assignment similar to that described above (see, for example, data flow 614 of FIG. 6). At data flow 714, the provenance verifier device 112 records the assignment of the data broker device 106B to the compute device 108 to the block chain 120. Additionally, in some embodiments, the provenance verifier device 112 may also record the de-assignment of the data broker device 106A from the compute device 108 to the block chain 120. Further, in some embodiments, the provenance verifier device 112 may transfer two Satoshis to the data broker device 106B (see, for example, data flow 616 of FIG. 6).

At data flow 716, the data broker device 106B acknowledges the assignment of the compute device 108 to the data broker device 106B. In particular, in some embodiments, the data broker device 106B adds a record to the block chain 120 indicative of the assignment of the compute device 108 to the data broker device 106B. Further, in some embodiments, the data broker device 106B transfers one Satoshi back to the provenance verifier device 112 to indicate, for example, that the assignment has been acknowledged.

At data flow 718, the provenance verifier device 112 verifies the block chain entries posted to the block chain 120 by the data broker devices 106A, 106B. More specifically, in the illustrative embodiment, the provenance verifier device 112 verifies the block chain entry posted to the block chain 120 associated with de-assignment of the data broker device 106A from the compute device 108 and verifies the block chain entry posted to the block chain associated with the assignment of the data broker device 106B to the compute device 108. Further, in some embodiments, the provenance verifier device 112 may acknowledge receipt of the Satoshis from the data broker devices 106A, 106B. In some embodiments, it should be appreciated that the provenance verifier device 112 may post a verification record to the block chain 120 for posterity.

At data flow 720, the owner of the compute device 108 verifies (e.g., via the onboarding device/tool 110) the assignment of the data broker device 106B and the de-assignment of the data broker device 106A based on the corresponding entries on the block chain 120. In some embodiments, the provenance verifier device 112 may also separately inform the onboarding device 110 of the corresponding re-assignment transactions. It should be appreciated that, in some embodiments, once the de-assignment and assignment have been verified, the onboarding device 110 may instruct the compute device 108 to commit the key associated with the newly assigned data broker device 106B (KDB2_data_pub) to secure storage (e.g., to the memory 214 and/or the data storage 216 of the compute device 108). As indicated above, the techniques described herein permit the change of data brokers without changing the ownership status of the underlying device.

Figure 8:
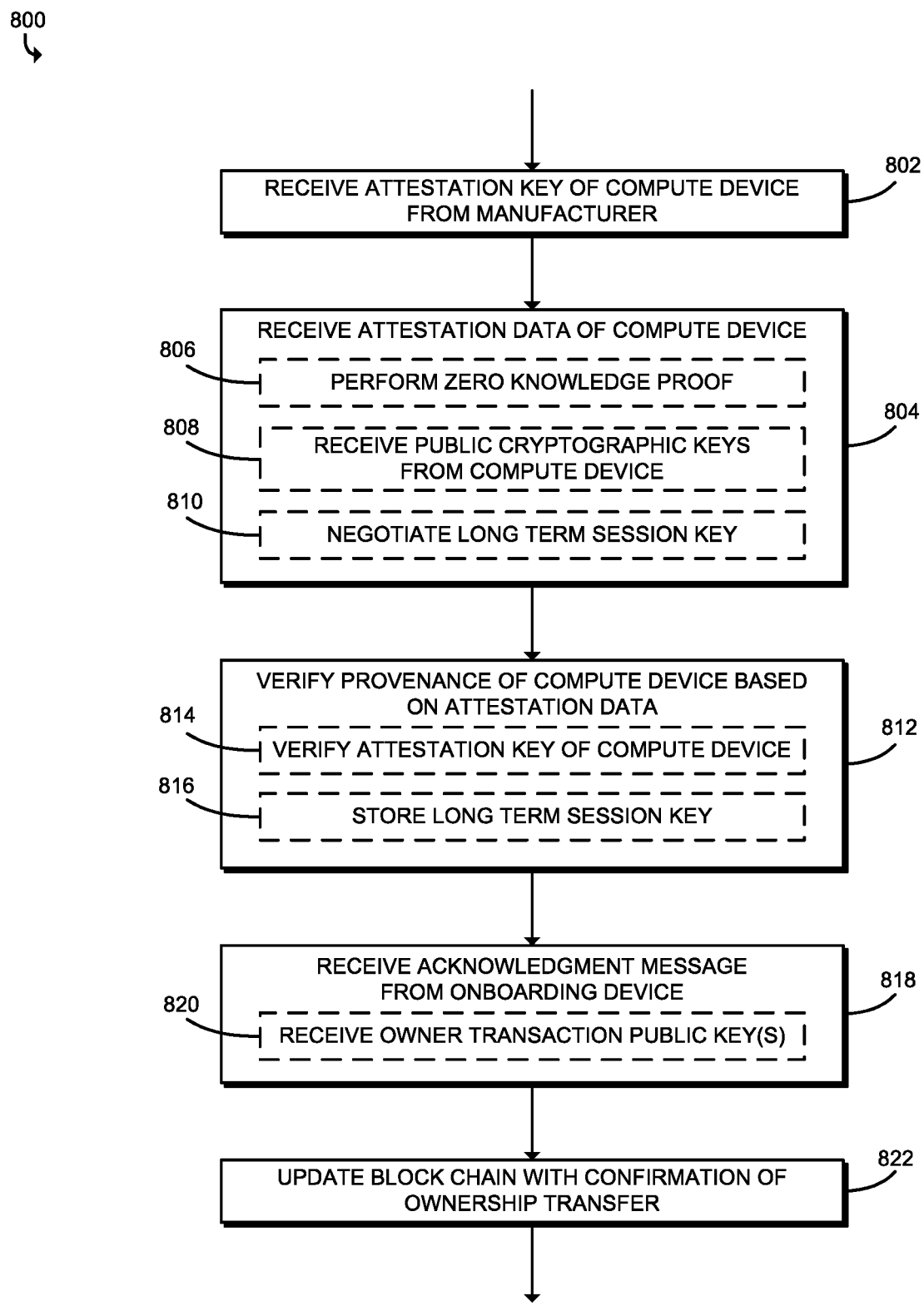
FIG. 8 is a simplified flow diagram of at least one embodiment of a method for transferring device ownership that may be executed by the data broker device of FIG. 2.

Referring now to FIG. 8, in use, the data broker device 106 may execute a method 800 for transferring device ownership. It should be appreciated that, in some embodiments, the techniques of the method 800 may be executed by one or more of the modules of the environment 300 of the data broker device 106 as shown in FIG. 3. The illustrative method 800 begins with block 802 in which the data broker device 106 receives an attestation key of the compute device 108 from the manufacturer device 102 (see, for example, data flow 502 of FIG. 5). In block 804, the data broker device 106 receives attestation data of the compute device 108 (see, for example, data flow 512 of FIG. 5). As described above, the compute device 108 may connect with the data broker device 106 and attest to its security properties using, for example, the private EPID key provisioned to the compute device 108 by the manufacturer. In particular, in block 806, the compute device 108 may assert/perform a zero knowledge proof to, or in coordination with, the data broker device 106 in order to make such an attestation. Further, in block 808, the data broker device 106 may receive one or more public cryptographic keys from the compute device 108. For example, the compute device 108 may supply the cryptographic keys, KCD_trans_pub and KCD_data_pub, to the data broker device 106. Additionally, in block 810, the data broker device 106 may negotiate a long-term session key with the compute device 108 for subsequent secure interactions (e.g., via a Diffie-Hellman or PAKE key exchange algorithm).

In block 812, the data broker device 106 verifies the provenance of the compute device 108 based on, for example, the received attestation data (see, for example, data flow 514 of FIG. 5). In particular, in block 814, the data broker device 106 may verify the attestation key (KCD_mfg_priv) of the compute device 108 using the corresponding public key (KCD_mfg_pub) and, in block 816, may save the long-term session key to a secure memory (e.g., with public keys received from the compute device 108).

In block 818, the data broker device 106 receives an acknowledgement message from the onboarding device 110 by which the onboarding device 110 acknowledges that it is the entity that is taking ownership of the compute device 108 and taking administrative control of the compute device 108 (see, for example, data flow 516). In some embodiments, in block 820, the data broker device 106 may receive the owner transaction public keys (under PSK) from the onboarding device 110 as described above. In block 822, the data broker device 106 updates the block chain 120 with a confirmation of the ownership transfer (see, for example, data flow 518 of FIG. 5). For example, as described above, the message $\text{Sign}_{KPV\_trans\_priv}$(KCD_trans_pub, KCD_data_pub, KOBT_trans_pub, KOBT_data_pub) may be saved to the block chain 120.

Figure 9:
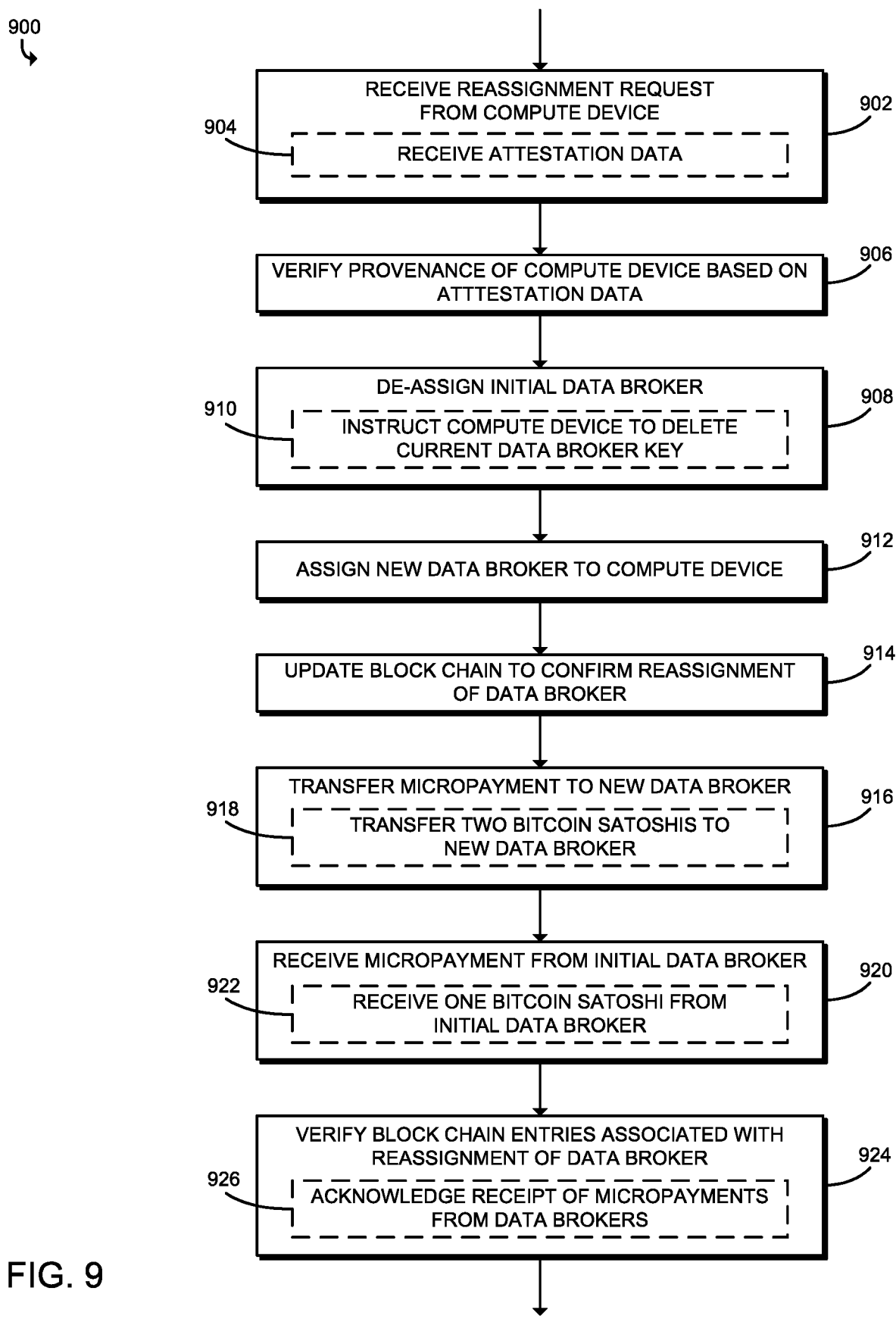
FIG. 9 is a simplified flow diagram of at least one embodiment of a method for data broker reassignment that may be executed by the provenance verifier device of FIG. 1.

Referring now to FIG. 9, in use, the provenance verifier device 112 may execute a method 900 for data broker reassignment. It should be appreciated that, in some embodiments, the techniques of the method 900 may be executed by one or more of the modules of the environment 400 of the provenance verifier device 112 as shown in FIG. 4. The illustrative method 900 begins with block 902 in which the provenance verifier device 112 receives a reassignment request from the compute device 108 requesting a data broker device 106B different from the current data broker device 106A be used (see, for example, data flow 702 of FIG. 7). In doing so, in block 904, the provenance verifier device 112 may receive attestation data from the compute device 108 as described above. In block 906, the provenance verifier device 112 verifies the provenance of the compute device 108 (see, for example, data flow 706 of FIG. 7). As indicated above, in doing so, the provenance verifier device 112 may determine whether the PSK and/or the new data broker keys are acceptable for subsequent use. In some embodiments, the PSK session fails if the compute device 108 and the provenance verifier device 112 cannot agree on the PSK key to use to establish a secure communication session.

In block 908, the provenance verifier device 112 de-assigns the initial/current data broker device 106A from the compute device 108 (see, for example, data flow 708 of FIG. 7). In doing so, in block 910, the provenance verifier device 112 may instruct the data broker device 106A to delete the key KCD_data_pub associated with the compute device 108. As described above, the data broker device 106A acknowledges the de-assignment, updates the block chain 120, and transfers one Satoshi back to the provenance verifier device 112. In block 912, the provenance verifier device 112 assigns the new data broker device 106B to the compute device 108 (see, for example, data flow 712 of FIG. 7) and, in block 814, the provenance verifier device 112 updates the block chain 120 to confirm reassignment of the data broker (see, for example, data flow 714 of FIG. 7).

In block 916, the provenance verifier device 112 transfers a micropayment to the new data broker device 106B as described above. For example, in block 918, the provenance verifier device 112 may transfer two Bitcoin Satoshis to the data broker device 106B. Of course, as described above, the provenance verifier device 112 may utilize another cryptocurrency in other embodiments. As such, in some embodiments, the provenance verifier device 112 may perform a null transaction and/or transfer two units of the lowest denomination of a particular cryptocurrency. In block 920, the provenance verifier device 112 receives a micropayment from the de-assigned data broker device 106A. In particular, in block 922, the provenance verifier device 112 may receive one Bitcoin Satoshi from the data broker device 106A. It should be appreciated that the Satoshi may be a subset of Bitcoin Satoshis previously transferred to the first data broker device by the provenance verifier device 112 during an assignment of the data broker device 106A to the compute device 108 as described above.

In block 924, the provenance verifier device 112 verifies the block chain entries associated with reassignment of the data broker (see, for example, data flow 718 of FIG. 7). In particular, as described above, the provenance verifier device 112 may verify the block chain entry posted to the block chain 120 associated with de-assignment of the data broker device 106A from the compute device 108 and verify the block chain entry posted to the block chain associated with the assignment of the data broker device 106B to the compute device 108. In block 926, the provenance verifier device 112 may acknowledge receipt of the micropayments from the data broker devices 106A, 106B.

EXAMPLES

Illustrative examples of the technologies disclosed herein are provided below. An embodiment of the technologies may include any one or more, and any combination of, the examples described below.

Example 1 includes a data broker device for transferring ownership of a compute device, the data broker device comprising a verification module to (i) receive a provenance verification key of the compute device from a manufacturer device, (ii) receive attestation data of the compute device, wherein the attestation data is indicative of one or more security attributes of the compute device, and (iii) verify a provenance of the compute device based on the attestation data; and a block chain module to update a block chain with an acknowledgment of an assignment of the compute device to the data broker device, wherein the block chain identifies each transaction associated with ownership of the compute device.

Example 2 includes the subject matter of Example 1, and wherein to receive the provenance verification key comprises to receive a public cryptographic key of the compute device provisioned to the compute device during manufacture of the compute device.

Example 3 includes the subject matter of any of Examples 1 and 2, and wherein the provenance verification key is a cryptographic key associated with a transaction identifier of an ownership transfer of the compute device.

Example 4 includes the subject matter of any of Examples 1-3, and wherein to receive the attestation data comprises to perform a zero knowledge proof with the compute device.

Example 5 includes the subject matter of any of Examples 1-4, and wherein to receive the attestation data comprises to receive one or more public cryptographic keys from the compute device.

Example 6 includes the subject matter of any of Examples 1-5, and wherein to receive the one or more public cryptographic keys comprises to receive a public cryptographic key of the compute device associated with a transfer of ownership of the compute device.

Example 7 includes the subject matter of any of Examples 1-6, and wherein to receive the one or more public cryptographic keys comprises to receive another public cryptographic key of the compute device associated with a transfer of data of the compute device to the data broker device.

Example 8 includes the subject matter of any of Examples 1-7, and wherein to receive the attestation data comprises to negotiate a long-term session key with the compute device.

Example 9 includes the subject matter of any of Examples 1-8, and wherein the verification module is further to store the long-term session key in response to verification of the provenance of the compute device.

Example 10 includes the subject matter of any of Examples 1-9, and wherein to verify the provenance of the compute device comprises to verify an embedded cryptographic key of the compute device based on the received provenance verification key.

Example 11 includes the subject matter of any of Examples 1-10, and wherein the embedded cryptographic key is a private Enhanced Privacy Identification (EPID) key and the provenance verification key is a public EPID key corresponding with the private EPID key.

Example 12 includes the subject matter of any of Examples 1-11, and wherein to update the block chain comprises to post the provenance verification key and a public cryptographic key of the data broker device to the block chain.

Example 13 includes a method for transferring ownership of a compute device by a data broker device, the method comprising receiving, by the data broker device, a provenance verification key of the compute device from a manufacturer device; receiving, by the data broker device, attestation data of the compute device, wherein the attestation data is indicative of one or more security attributes of the compute device; verifying, by the data broker device, a provenance of the compute device based on the attestation data; and updating, by the data broker device, a block chain with an acknowledgment of an assignment of the compute device to the data broker device, wherein the block chain identifies each transaction associated with ownership of the compute device.

Example 14 includes the subject matter of Examples 13, and wherein receiving the provenance verification key comprises receiving a public cryptographic key of the compute device provisioned to the compute device during manufacture of the compute device.

Example 15 includes the subject matter of any of Examples 13 and 14, and wherein the provenance verification key is a cryptographic key associated with a transaction identifier of an ownership transfer of the compute device.

Example 16 includes the subject matter of any of Examples 13-15, and wherein receiving the attestation data comprises performing a zero knowledge proof with the compute device.

Example 17 includes the subject matter of any of Examples 13-16, and wherein receiving the attestation data comprises receiving one or more public cryptographic keys from the compute device.

Example 18 includes the subject matter of any of Examples 13-17, and wherein receiving the one or more public cryptographic keys comprises receiving a public cryptographic key of the compute device associated with a transfer of ownership of the compute device.

Example 19 includes the subject matter of any of Examples 13-18, and wherein receiving the one or more public cryptographic keys comprises receiving another public cryptographic key of the compute device associated with a transfer of data of the compute device to the data broker device.

Example 20 includes the subject matter of any of Examples 13-19, and wherein receiving the attestation data comprises negotiating a long-term session key with the compute device.

Example 21 includes the subject matter of any of Examples 13-20, and further including storing, by the data broker device, the long-term session key in response to verification of the provenance of the compute device.

Example 22 includes the subject matter of any of Examples 13-21, and wherein verifying the provenance of the compute device comprises verifying an embedded cryptographic key of the compute device based on the received provenance verification key.

Example 23 includes the subject matter of any of Examples 13-22, and wherein the embedded cryptographic key is a private Enhanced Privacy Identification (EPID) key and the provenance verification key is a public EPID key corresponding with the private EPID key.

Example 24 includes the subject matter of any of Examples 13-23, and wherein updating the block chain comprises posting the provenance verification key and a public cryptographic key of the data broker device to the block chain.

Example 25 includes a computing device comprising a processor; and a memory having stored therein a plurality of instructions that when executed by the processor cause the computing device to perform the method of any of Examples 13-24.

Example 26 includes one or more machine-readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a data broker device for transferring ownership of a compute device, the data broker device comprising means for receiving a provenance verification key of the compute device from a manufacturer device; means for receiving attestation data of the compute device, wherein the attestation data is indicative of one or more security attributes of the compute device; means for verifying a provenance of the compute device based on the attestation data; and means for updating a block chain with an acknowledgment of an assignment of the compute device to the data broker device, wherein the block chain identifies each transaction associated with ownership of the compute device.

Example 29 includes the subject matter of Example 28, and wherein the means for receiving the provenance verification key comprises means for receiving a public cryptographic key of the compute device provisioned to the compute device during manufacture of the compute device.

Example 30 includes the subject matter of any of Examples 28 and 29, and wherein the provenance verification key is a cryptographic key associated with a transaction identifier of an ownership transfer of the compute device.

Example 31 includes the subject matter of any of Examples 28-30, and wherein the means for receiving the attestation data comprises means for performing a zero knowledge proof with the compute device.

Example 32 includes the subject matter of any of Examples 28-31, and wherein the means for receiving the attestation data comprises means for receiving one or more public cryptographic keys from the compute device.

Example 33 includes the subject matter of any of Examples 28-32, and wherein the means for receiving the one or more public cryptographic keys comprises means for receiving a public cryptographic key of the compute device associated with a transfer of ownership of the compute device.

Example 34 includes the subject matter of any of Examples 28-33, and wherein the means for receiving the one or more public cryptographic keys comprises means for receiving another public cryptographic key of the compute device associated with a transfer of data of the compute device to the data broker device.

Example 35 includes the subject matter of any of Examples 28-34, and wherein the means for receiving the attestation data comprises means for negotiating a long-term session key with the compute device.

Example 36 includes the subject matter of any of Examples 28-35, and further including means for storing the long-term session key in response to verification of the provenance of the compute device.

Example 37 includes the subject matter of any of Examples 28-36, and wherein the means for verifying the provenance of the compute device comprises means for verifying an embedded cryptographic key of the compute device based on the received provenance verification key.

Example 38 includes the subject matter of any of Examples 28-37, and wherein the embedded cryptographic key is a private Enhanced Privacy Identification (EPID) key and the provenance verification key is a public EPID key corresponding with the private EPID key.

Example 39 includes the subject matter of any of Examples 28-38, and wherein the means for updating the block chain comprises means for posting the provenance verification key and a public cryptographic key of the data broker device to the block chain.

Example 40 includes a provenance verifier device for data broker reassignment, the provenance verifier device comprising an assignment module to (i) receive, from a compute device, a request to reassign the compute device from a first data broker device to a second data broker device, (ii) de-assign the first data broker device from the compute device, and (iii) assign the second data broker device to the compute device; a block chain module to (i) update a block chain to confirm the data broker reassignment, wherein the block chain identifies each transaction associated with ownership of the compute device and (ii) verify block chain entries of the block chain associated with the data broker assignment to confirm a valid reassignment.

Example 41 includes the subject matter of Example 40, and wherein to receive the request to reassign the compute device comprises to receive attestation data of the compute device, wherein the attestation date is indicative of one or more security attributes of the compute device.

Example 42 includes the subject matter of any of Examples 40 and 41, and further including a verification module to verify a provenance of the compute device based on the attestation data.

Example 43 includes the subject matter of any of Examples 40-42, and wherein to de-assign the first data broker device comprises to instruct the first data broker device to delete a public cryptographic key of the compute device from a memory of the first data broker device.

Example 44 includes the subject matter of any of Examples 40-43, and wherein the block chain module is further to transfer a first micropayment to the second data broker device in response to assignment of the second data broker device to the compute device.

Example 45 includes the subject matter of any of Examples 40-44, and wherein to transfer the first micropayment comprises to transfer two Bitcoin Satoshis to the second data broker device.

Example 46 includes the subject matter of any of Examples 40-45, and wherein to transfer the first micropayment comprises to perform a null transaction based on a cryptocurrency.

Example 47 includes the subject matter of any of Examples 40-46, and wherein to transfer the first micropayment comprises to transfer two units of a lowest denomination of a cryptocurrency.

Example 48 includes the subject matter of any of Examples 40-47, and wherein the block chain module is further to receive a second micropayment from the first data broker device in response to de-assignment of the first data broker device from the compute device.

Example 49 includes the subject matter of any of Examples 40-48, and wherein to receive the second micropayment comprises to receive one Bitcoin Satoshi from the first data broker device.

Example 50 includes the subject matter of any of Examples 40-49, and wherein the one Bitcoin Satoshi is a subset of Bitcoin Satoshis previously transferred to the first data broker device by the provenance verifier device during an assignment of the first data broker device to the compute device.

Example 51 includes the subject matter of any of Examples 40-50, and wherein to receive the second micropayment comprises to receive one unit of the lowest denomination of the cryptocurrency.

Example 52 includes the subject matter of any of Examples 40-51, and wherein to verify the block chain entries comprises to acknowledge receipt of the first micropayment and the second micropayment.

Example 53 includes a method for data broker reassignment by a provenance verifier device, the method comprising receiving, by the provenance verifier device and from a compute device, a request to reassign the compute device from a first data broker device to a second data broker device; de-assigning, by the provenance verifier device, the first data broker device from the compute device; assigning, by the provenance verifier device, the second data broker device to the compute device; updating, by the provenance verifier device, a block chain to confirm the data broker reassignment, wherein the block chain identifies each transaction associated with ownership of the compute device; and verifying, by the provenance verifier device, block chain entries of the block chain associated with the data broker assignment to confirm a valid reassignment.

Example 54 includes the subject matter of Example 53, and wherein receiving the request to reassign the compute device comprises receiving attestation data of the compute device, wherein the attestation date is indicative of one or more security attributes of the compute device.

Example 55 includes the subject matter of any of Examples 53 and 54, and further including verifying, by the provenance verifier device, a provenance of the compute device based on the attestation data.

Example 56 includes the subject matter of any of Examples 53-55, and wherein de-assigning the first data broker device comprises instructing the compute device to delete a public cryptographic key of the first data broker device from a memory of the compute device.

Example 57 includes the subject matter of any of Examples 53-56, and further including transferring, by the provenance verifier device, a first micropayment to the second data broker device in response to assignment of the second data broker device to the compute device.

Example 58 includes the subject matter of any of Examples 53-57, and wherein transferring the first micropayment comprises transferring two Bitcoin Satoshis to the second data broker device.

Example 59 includes the subject matter of any of Examples 53-58, and wherein transferring the first micropayment comprises performing a null transaction based on a cryptocurrency.

Example 60 includes the subject matter of any of Examples 53-59, and wherein transferring the first micropayment comprises transferring two units of a lowest denomination of a cryptocurrency.

Example 61 includes the subject matter of any of Examples 53-60, and further including receiving, by the provenance verifier device, a second micropayment from the first data broker device in response to de-assignment of the first data broker device from the compute device.

Example 62 includes the subject matter of any of Examples 53-61, and wherein receiving the second micropayment comprises receiving one Bitcoin Satoshi from the first data broker device.

Example 63 includes the subject matter of any of Examples 53-62, and wherein the one Bitcoin Satoshi is a subset of Bitcoin Satoshis previously transferred to the first data broker device by the provenance verifier device during an assignment of the first data broker device to the compute device.

Example 64 includes the subject matter of any of Examples 53-63, and wherein receiving the second micropayment comprises receiving one unit of the lowest denomination of the cryptocurrency.

Example 65 includes the subject matter of any of Examples 53-64, and wherein verifying the block chain entries comprises acknowledging receipt of the first micropayment and the second micropayment.

Example 66 includes a computing device comprising a processor; and a memory having stored therein a plurality of instructions that when executed by the processor cause the computing device to perform the method of any of Examples 53-65.

Example 67 includes one or more machine-readable storage media comprising a plurality of instructions stored thereon that in response to being executed result in a computing device performing the method of any of Examples 53-65.

Example 68 includes a provenance verifier device for data broker reassignment, the provenance verifier device comprising means for receiving, from a compute device, a request to reassign the compute device from a first data broker device to a second data broker device; means for de-assigning the first data broker device from the compute device; means for assigning the second data broker device to the compute device; means for updating a block chain to confirm the data broker reassignment, wherein the block chain identifies each transaction associated with ownership of the compute device; and means for verifying block chain entries of the block chain associated with the data broker assignment to confirm a valid reassignment.

Example 69 includes the subject matter of Example 68, and wherein the means for receiving the request to reassign the compute device comprises means for receiving attestation data of the compute device, wherein the attestation date is indicative of one or more security attributes of the compute device.

Example 70 includes the subject matter of any of Examples 68 and 69, and further including means for verifying a provenance of the compute device based on the attestation data.

Example 71 includes the subject matter of any of Examples 68-70, and wherein the means for de-assigning the first data broker device comprises means for instructing the compute device to delete a public cryptographic key of the first data broker device from a memory of the compute device.

Example 72 includes the subject matter of any of Examples 68-71, and further including means for transferring a first micropayment to the second data broker device in response to assignment of the second data broker device to the compute device.

Example 73 includes the subject matter of any of Examples 68-72, and wherein the means for transferring the first micropayment comprises means for transferring two Bitcoin Satoshis to the second data broker device.

Example 74 includes the subject matter of any of Examples 68-73, and wherein the means for transferring the first micropayment comprises means for performing a null transaction based on a cryptocurrency.

Example 75 includes the subject matter of any of Examples 68-74, and wherein the means for transferring the first micropayment comprises means for transferring two units of a lowest denomination of a cryptocurrency.

Example 76 includes the subject matter of any of Examples 68-75, and further including means for receiving a second micropayment from the first data broker device in response to de-assignment of the first data broker device from the compute device.

Example 77 includes the subject matter of any of Examples 68-76, and wherein the means for receiving the second micropayment comprises means for receiving one Bitcoin Satoshi from the first data broker device.

Example 78 includes the subject matter of any of Examples 68-77, and wherein the one Bitcoin Satoshi is a subset of Bitcoin Satoshis previously transferred to the first data broker device by the provenance verifier device during an assignment of the first data broker device to the compute device.

Example 79 includes the subject matter of any of Examples 68-78, and wherein the means for receiving the second micropayment comprises means for receiving one unit of the lowest denomination of the cryptocurrency.

Example 80 includes the subject matter of any of Examples 68-70, and wherein the means for verifying the block chain entries comprises means for acknowledging receipt of the first micropayment and the second micropayment.

The invention claimed is:

1. A data broker device for transferring ownership of a compute device, the data broker device comprising:
    verification circuitry to (i) receive a provenance verification key of the compute device from a manufacturer device, (ii) receive attestation data of the compute device, wherein the attestation data is indicative of one or more security attributes of the compute device, wherein receive the attestation data comprises negotiate a long-term session key with the compute device, and (iii) verify a provenance of the compute device based on the attestation data; and
    block chain circuitry to update a block chain with an acknowledgment of an assignment of the compute device to the data broker device and an indication of present ownership of the compute device, wherein the present ownership is different from the data broker device and wherein the block chain identifies each transaction associated with ownership of the compute device.

2. The data broker device of claim 1, wherein to receive the provenance verification key comprises to receive a public cryptographic key of the compute device provisioned to the compute device during manufacture of the compute device.

3. The data broker device of claim 1, wherein the provenance verification key is a cryptographic key associated with a transaction identifier of an ownership transfer of the compute device.

4. The data broker device of claim 1, wherein to receive the attestation data comprises to perform a zero knowledge proof with the compute device.

5. The data broker device of claim 1, wherein to receive the attestation data comprises to receive one or more public cryptographic keys from the compute device.

6. The data broker device of claim 1, wherein to verify the provenance of the compute device comprises to verify an embedded cryptographic key of the compute device based on the received provenance verification key.

7. The data broker device of claim 6, wherein the embedded cryptographic key is a private Enhanced Privacy Identification (EPID) key and the provenance verification key is a public EPID key corresponding with the private EPID key.

8. The data broker device of claim 1, wherein to update the block chain comprises to post the provenance verification key and a public cryptographic key of the data broker device to the block chain.

9. A method for transferring ownership of a compute device by a data broker device, the method comprising:
    receiving, by the data broker device, a provenance verification key of the compute device from a manufacturer device;
    receiving, by the data broker device, attestation data of the compute device, wherein the attestation data is indicative of one or more security attributes of the compute device, wherein receiving the attestation data comprises negotiating a long-term session key with the compute device;
    verifying, by the data broker device, a provenance of the compute device based on the attestation data; and updating, by the data broker device, a block chain with an acknowledgment of an assignment of the compute device to the data broker device and an indication of present ownership of the compute device, wherein the present ownership is different from the data broker device and wherein the block chain identifies each transaction associated with ownership of the compute device.

10. The method of claim 9, wherein receiving the provenance verification key comprises receiving a public cryptographic key of the compute device provisioned to the compute device during manufacture of the compute device.

11. The method of claim 9, wherein the provenance verification key is a cryptographic key associated with a transaction identifier of an ownership transfer of the compute device.

12. The method of claim 9, wherein receiving the attestation data comprises performing a zero knowledge proof with the compute device.

13. The method of claim 9, wherein verifying the provenance of the compute device comprises verifying an embedded cryptographic key of the compute device based on the received provenance verification key.

14. The method of claim 13, wherein the embedded cryptographic key is a private Enhanced Privacy Identification (EPID) key and the provenance verification key is a public EPID key corresponding with the private EPID key.

15. The method of claim 9, wherein updating the block chain comprises posting the provenance verification key and a public cryptographic key of the data broker device to the block chain.

16. One or more non-transitory, machine-readable storage media comprising a plurality of instructions stored thereon that, when executed, cause a computing device to:
receive a provenance verification key of the compute device from a manufacturer device;
receive attestation data of the compute device, wherein the attestation data is indicative of one or more security attributes of the compute device, wherein receive the attestation data comprises negotiate a long-term session key with the compute device;
verify a provenance of the compute device based on the attestation data; and
update a block chain with an acknowledgment of an assignment of the compute device to a data broker device and an indication of present ownership of the compute device, wherein the present ownership is different from the data broker device and wherein the block chain identifies each transaction associated with ownership of the compute device.

17. The one or more non-transitory, machine-readable storage media of claim 16, wherein to receive the provenance verification key comprises to receive a public cryptographic key of the compute device provisioned to the compute device during manufacture of the compute device.

18. The one or more non-transitory, machine-readable storage media of claim 16, wherein the provenance verification key is a cryptographic key associated with a transaction identifier of an ownership transfer of the compute device.

19. The one or more non-transitory, machine-readable storage media of claim 16, wherein to receive the attestation data comprises to perform a zero knowledge proof with the compute device.

20. The one or more non-transitory, machine-readable storage media of claim 16, wherein to verify the provenance of the compute device comprises to verify an embedded cryptographic key of the compute device based on the received provenance verification key.

21. The one or more non-transitory, machine-readable storage media of claim 20, wherein the embedded cryptographic key is a private Enhanced Privacy Identification (EPID) key and the provenance verification key is a public EPID key corresponding with the private EPID key.

22. The one or more non-transitory, machine-readable storage media of claim 16, wherein to update the block chain comprises to post the provenance verification key and a public cryptographic key of the data broker device to the block chain.

* * * * *